US009802509B2

(12) United States Patent
Matsushima et al.

(10) Patent No.: US 9,802,509 B2
(45) Date of Patent: Oct. 31, 2017

(54) CONTROL DEVICE OF ELECTRIC VEHICLE

(71) Applicant: KAWASAKI JUKOGYO KABUSHIKI KAISHA, Kobe-shi, Hyogo (JP)

(72) Inventors: Hirohide Matsushima, Kobe (JP); Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 14/651,030

(22) PCT Filed: Dec. 19, 2012

(86) PCT No.: PCT/JP2012/008100
§ 371 (c)(1),
(2) Date: Jun. 10, 2015

(87) PCT Pub. No.: WO2014/097351
PCT Pub. Date: Jun. 26, 2014

(65) Prior Publication Data
US 2015/0314703 A1 Nov. 5, 2015

(51) Int. Cl.
*B60L 15/20* (2006.01)
*B60L 3/12* (2006.01)
*B60L 11/14* (2006.01)

(52) U.S. Cl.
CPC .......... *B60L 15/2054* (2013.01); *B60L 3/12* (2013.01); *B60L 11/14* (2013.01);
(Continued)

(58) Field of Classification Search
CPC ........ B60L 3/12; B60L 11/14; B60L 15/2054; B60L 2240/12; B60L 2240/421;
(Continued)

(56) References Cited

U.S. PATENT DOCUMENTS 3,370,477 A * 2/1968 Lewis .................... F16H 63/18
 74/337.5
4,758,967 A * 7/1988 Shmuter ............. G01M 13/025
 73/115.01
(Continued)

FOREIGN PATENT DOCUMENTS

CN 102082537 A * 6/2011
JP H06276611 A 9/1994
(Continued)

OTHER PUBLICATIONS

Robert Oshana & Mark Kraeling, Software Engineering for Embedded Systems: Methods, Practical Techniques, and Applications, p. xxiii-xxvii, 1-3 and 155-158 (2013).*
(Continued)

*Primary Examiner* — Nicholas Kiswanto
*Assistant Examiner* — Tamara Weber
(74) *Attorney, Agent, or Firm* — Alleman Hall Creasman & Tuttle LLP (57) ABSTRACT

A control device includes a torque setting section for setting a target output torque of an electric motor based on a driving state including an accelerator operation amount; a non-transmission state determiner section for determining whether a driving power transmission path is in a non-transmission state in which driving power is not permitted to be transmitted from the electric motor to a drive wheel or in a transmission state in which the driving power is permitted; and a torque compensation section for compensating the target output torque, when the non-transmission state determiner section determines that the driving power transmission path is in the non-transmission state. The torque compensation section compensates the target output torque by using a slowness characteristic in which a change in the motor rotational speed which occurs with time is slower when in the non-transmission state than when in the transmission state.

13 Claims, 3 Drawing Sheets

(52) U.S. Cl.
CPC ..... *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2250/16* (2013.01); *B60L 2250/28* (2013.01); *B60L 2260/46* (2013.01); *B60L 2270/145* (2013.01); *Y02T 10/645* (2013.01); *Y02T 10/70* (2013.01); *Y02T 10/7077* (2013.01); *Y02T 10/7275* (2013.01)

(58) Field of Classification Search
CPC ......... B60L 2240/423; B60L 2240/441; B60L 2240/443; B60L 2240/486; B60L 2240/507; B60L 2250/16; B60L 2250/28; B60L 2260/46; B60L 2270/145; Y02T 10/645; Y02T 10/7275
See application file for complete search history.

(56) References Cited

U.S. PATENT DOCUMENTS

| | | | | |
|---|---|---|---|---|
| 5,462,501 A | * | 10/1995 | Bullmer | B60W 30/18 475/125 |
| 5,884,201 A | * | 3/1999 | Kawai | B60K 1/00 180/65.6 |
| 5,984,033 A | * | 11/1999 | Tamagawa | B60K 6/485 180/65.28 |
| 6,642,688 B1 | * | 11/2003 | Wallingford | B60L 7/14 318/11 |
| 2001/0020789 A1 | * | 9/2001 | Nakashima | B60K 6/365 290/40 C |
| 2005/0092538 A1 | | 5/2005 | Baldwin et al. | |
| 2013/0079967 A1 | * | 3/2013 | Terakawa | B60W 10/02 701/22 |

FOREIGN PATENT DOCUMENTS

| | | |
|---|---|---|
| JP | H06319210 A | 11/1994 |
| JP | 2000023309 A | 1/2000 |
| JP | 2003157819 A | 5/2003 |
| JP | 2006081323 A | 3/2006 |
| JP | 2007509813 A | 4/2007 |
| JP | 2010252526 A | 11/2010 |
| JP | 2012166682 A | 9/2012 |

OTHER PUBLICATIONS

ISA Japanese Patent Office, International Search Report Issued in Application No. PCT/JP2012/008100, Mar. 19, 2013, WIPO, 4 pages.

* cited by examiner

Fig. 3

CONTROL DEVICE OF ELECTRIC VEHICLE

TECHNICAL FIELD

The present invention relates to a control device of an electric vehicle including a transmission.

BACKGROUND ART

An electric motor has an output torque characteristic which is significantly different from that of an engine. For this reason, if a driver of an electric vehicle is familiar with driving an engine-driven vehicle, the driver may be perplexed due to a difference in driving feel while driving the electric vehicle. In the electric vehicle including a transmission, this difference is especially noticeable when the driver performs a shift change operation. Patent Literature 1 discloses a control device which controls the target output torque of an electric motor so that it reaches a negative value when an accelerator opening degree is smaller than a predetermined value and a clutch is disengaged.

CITATION LIST

Patent Literature

Patent Literature 1: Japanese Laid-Open Patent Application Publication No. 2010-252526

SUMMARY OF INVENTION

Technical Problem

In a shift-down operation, a motor rotational speed is increased for rev-matching. Typically, an electric motor has less inertia than an engine. Therefore, in cases where an accelerator is operated to be opened during the shift-down operation when a driving power transmission path is set in a non-transmission state, the motor rotational speed tends to sensitively respond to change in an accelerator opening degree and rapidly increases, and, in some cases, significantly exceeds an intended motor rotational speed. In such cases, it is difficult to perform the rev-matching. The control device disclosed in Patent Literature 1 is configured to merely decrease the motor rotational speed in an accelerated manner, in the state in which a clutch is disengaged. In other words, this control device is not well suited for rev-matching with the accelerator operation.

Accordingly, an object of the present invention is to easily perform rev-matching, according to accelerator operation, in a state in which a driving power transmission path is disconnected, in an electric vehicle including a transmission interposed between an electric motor and a drive wheel.

To achieve the above-described object, the present invention has been made. The present invention provides a control device of an electric vehicle including a transmission provided on a driving power transmission path through which a driving power is transmitted from an electric motor to a drive wheel, the control device comprising: a torque setting section for setting a target output torque of the electric motor based on a driving state including an accelerator operation amount; a non-transmission state determiner section for determining whether the driving power transmission path is in a non-transmission state in which the driving power is not permitted to be transmitted from the electric motor to the drive wheel or in a transmission state in which the driving power is permitted to be transmitted from the electric motor to the drive wheel; and a torque compensation section for compensating the target output torque set by the torque setting section, when the non-transmission state determiner section determines that the driving power transmission path is in the non-transmission state, wherein the torque compensation section compensates the target output torque set by the torque setting section by using a slowness characteristic in which a change in a motor rotational speed which occurs with time is slower when the driving power transmission path is in the non-transmission state than when the driving power transmission path is in the transmission state.

In accordance with this configuration, when the driving power transmission path is in the non-transmission state, the target output torque is compensated and a change in the motor rotational speed which occurs with time is made slow. Therefore, in the state in which the driving power transmission path is in the non-transmission state, a rapid change in the motor rotational speed, in response to an accelerator operation, can be suppressed. Therefore, in a case where the motor rotational speed is caused to conform to a desired motor rotational speed in the state in which the driving power transmission path is placed in the non-transmission state, it becomes possible to prevent a situation in which the motor rotational speed deviates from a proper range or fluctuates, even when the accelerator is operated, and to facilitate the rev-matching. For example, in a shift-down operation, the motor rotational speed easily falls within a high rotational speed range suitable for rev-matching and is maintained in this high rotational speed range, without needing to delicately manipulate the accelerator.

The torque compensation section may compensate the target output torque by using a compensation value calculation formula including a decrease term for decreasing the motor rotational speed.

In accordance with this configuration, when the driving power transmission path is in the non-transmission state, the target output torque is compensated, and decreasing of the motor rotational speed is facilitated. Therefore, in a shift-up operation, it becomes possible to reduce the time for the motor rotational speed to fall within a low rotational speed range suitable for the rev-matching. Therefore, the shift-up can be performed smoothly.

The torque compensation section may compensate the target output torque such that the compensated output torque reaches a value required to rotate the electric motor at an angular acceleration of a virtual rotary member which is estimated to be generated when the virtual rotary member is rotated with the target output torque, the virtual rotary member having a virtual inertia larger than a motor inertia of the electric motor.

In accordance with this configuration, when the driving power transmission path is in the non-transmission state, the electric motor would be rotated at an angular acceleration equal to that of the virtual rotary member having the virtual inertia larger than the motor inertia of the electric motor. As a result, a change in the motor rotational speed which occurs with time corresponding to an accelerator opening degree, is slower than in a case where the target output torque is not compensated. When the virtual inertia is considered separately from the motor inertia, the change in the motor rotational speed which occurs with time can easily simulate a change in the rotational speed of the virtual rotary member which occurs with time. This makes it possible to easily architect the control device, and easily attain a desired result. For example, if the virtual rotary member is a crankshaft of the engine, the behavior of the motor rotational speed in the state in which the driving power transmission path is in the non-transmission state can easily simulate an engine speed. This allows the driver to attain a driving feel similar to that of driving of an engine-driven vehicle.

The virtual rotary member may be defined as having a rotational resistance higher than a rotational resistance of the electric motor.

In accordance with this configuration, when the driving power transmission path is in the non-transmission state, the motor rotational speed would be decreased as in the virtual rotary member with a rotational resistance higher than that of the electric motor. When the rotational resistance of the virtual rotary member is considered separately from the rotational resistance of the electric motor, the decrease behavior of the motor rotational speed can easily simulate the decrease behavior of the rotational speed of the virtual rotary member. For example, it can be assumed that the virtual rotary member with a rotational resistance higher than that of the electric motor is the output shaft of the engine. Thus, the behavior of the motor rotational speed in the state in which the driving power transmission path is in the non-transmission state can easily simulate the engine speed. This allows the driver to attain a driving feel similar to that of driving the engine-driven vehicle.

The slowness characteristic used by the torque compensation section may be manually changeable.

In accordance with this configuration, the behavior of the motor rotational speed can be made compatible with a user's preference.

The slowness characteristic may be one of a plurality of slowness characteristics, the torque compensation section may select one slowness characteristic from the plurality of slowness characteristics, and compensate the target output torque by using the selected slowness characteristic.

In accordance with this configuration, the behavior of the motor rotational speed can be made compatible with a driving state.

Advantageous Effects of Invention

As should be appreciated from the above, in accordance with the present invention, rev-matching is easily performed, in association with an accelerator operation, in a state in which a driving power transmission path is disconnected (in a non-transmission state), in an electric vehicle including a transmission interposed between an electric motor and a drive wheel.

DESCRIPTION OF EMBODIMENTS

Hereinafter, the embodiment of the present invention will be described with reference to the accompanying drawings. Throughout the drawings, the same or corresponding components are identified by the same reference symbols and will not be described in detail repeatedly.

(Electric Vehicle)

Figure 1:
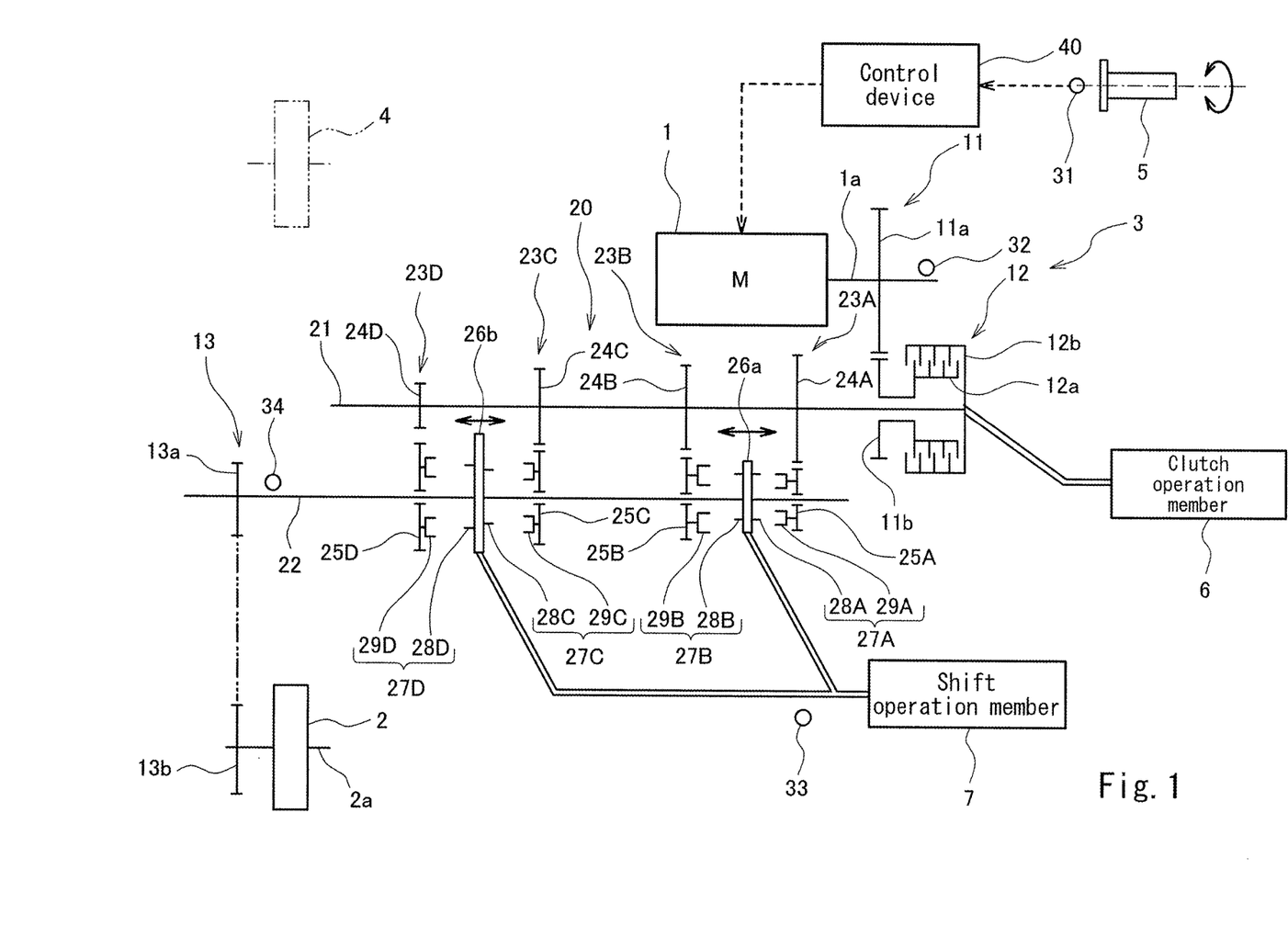
FIG. 1 is a schematic view of an electric vehicle incorporating a control device according to an embodiment.

FIG. 1 is a schematic view of an electric vehicle incorporating a control device 40 according to the embodiment. As shown in FIG. 1, the electric vehicle includes an electric motor 1 as a driving power source, a drive wheel 2 rotated by a driving power generated by the electric motor 1, and a driving power transmission path 3 through which the driving power is transmitted from the electric motor 1 to the drive wheel 2. Although FIG. 1 shows an electric motorcycle including one drive wheel 2 and one driven wheel 4 as an exemplary electric vehicle, the number of drive wheels, the number of driven wheels, and the number of wheels, in the electric vehicle are not particularly limited. All of the wheels may be drive wheels.

The electric motor 1 is controlled by the control device 40. The control device 40 is configured to control the electric motor 1 according to the driving state of the electric vehicle. The "driving state" includes the amount (hereinafter will also be referred to as "accelerator opening degree") of the driver's operation of an accelerator operation member 5. The control device 40 is configured to control the output torque and/or motor rotational speed of the electric motor 1 (i.e., rotational speed of a motor output shaft 1a) based on a signal received from an accelerator opening degree sensor 31 for detecting the accelerator opening degree.

In brief, if the accelerator opening degree is changed to be increased, the output torque of the electric motor 1 is increased, the motor rotational speed is increased, and thereby the speed and acceleration of the electric vehicle can be increased. On the other hand, if the accelerator opening degree is changed to be decreased, the output torque of the electric motor 1 is decreased, the motor rotational speed is decreased, and thereby the speed and acceleration of the electric vehicle can be decreased. The accelerator operation member 5 is used to input a requested output command, a requested speed command, or a requested acceleration/deceleration command, by the driver. The accelerator operation member 5 may be a pedal member, a grip member, or a lever member, depending on a vehicle configuration (in FIG. 1, the accelerator operation member 5 of a grip type suitable for the electric motorcycle is exemplarily shown). The accelerator opening degree corresponds to the operation amount or displacement amount of the accelerator operation member 5. The accelerator opening degree also corresponds to the output, speed, or acceleration requested by the driver. Furthermore, the accelerator opening degree corresponds to the signal output from the accelerator opening degree sensor 31 for detecting the operation amount or displacement amount of the accelerator operation member 5.

As the members to be operated by the driver, the electric vehicle includes a clutch operation member 6 and a shift operation member 7, in addition to the accelerator operation member 5. The clutch operation member 6 may be a pedal member, or a lever member, depending on the vehicle configuration. The shift operation member 7 may be a lever member or a pedal member, depending on the vehicle configuration.

(Driving Power Transmission Path)

The driving power transmission path 3 serves to transmit the rotation of the motor output shaft 1a of the electric motor 1 to an axle 2a of the drive wheel 2. The driving power transmission path 3 is configured as a driving power transmission mechanism, including a primary reduction gear (speed reduction) mechanism 11, a clutch 12, a transmission 20, and a final reduction gear mechanism 13. The transmission 20 includes an input shaft 21 and an output shaft 22 provided between the motor output shaft 1a and the axle 2a, and is mounted onto driving power transmission path 3.

The primary reduction gear mechanism 11 includes an activation element 11a which is rotatable along with the motor output shaft 1a, and a driven element 11b which is activated by the activation element 11a and is rotatable relative to the input shaft 21. The activation element 11a is provided coaxially with the motor output shaft 1a, while the driven element 11b is provided coaxially with the input shaft 21. The primary reduction gear mechanism 11 may include, for example, an external gear train.

The clutch 12 includes an input element 12a which is rotatable along with the driven element 11a and an output element 12b which is rotatable along with the input shaft 21. The input element 12a and the output element 12b are provided coaxially with the input shaft 21. The clutch 12 can be placed in one of an "engaged state," a "disengaged state," and a "slipping state," in response to the amount of the driver's operation of the clutch operation member 6. When the clutch 12 is in the engaged state, the output element 12b rotates along with the input element 12a, and the driving power is permitted to be transmitted from the electric motor 1 to the input shaft 21. When the clutch 12 is in the disengaged state, the output element 12b becomes free with respect to the input element 12a, and the driving power transmission between the motor output shaft 1a and the input shaft 21 does not take place, and the driving power transmission path 3 is in a "non-transmission state" in which the driving power is not permitted to be transmitted from the electric motor 1 to the drive wheel 2. When the clutch 12 is in the slipping state, the driving power transmission between the motor output shaft 1a and the input shaft 21 does not substantially take place, and the driving power transmission path 3 is in the "non-transmission state." As the clutch 12, for example, a multiple disc friction clutch may be used.

The transmission 20 can be placed in either a "gear-in state" or a "gear-out state" according to the position of the shift operation member 7. In the gear-in state, one of driving gear positions is set in the transmission 20, and the speed of the rotation of the input shaft 21 is changed with a change gear ratio corresponding to the set driving gear position, and the resulting rotation is transmitted to the output shaft 22. In the gear-out state, a neutral gear position is set in the transmission 20. The output shaft 22 becomes free with respect to the input shaft 21. The driving power transmission between the input shaft 21 and the output shaft 22 does not take place, and the driving power transmission path 3 is in the "non-transmission state."

The final reduction gear mechanism 13 includes an activation element 13a which is rotatable along with the output shaft 22, and a driven element 13b which is activated by the activation element 13a and is rotatable with the axle 2a. The activation element 13a is provided coaxially with the output shaft 22, while the driven element 13b is provided coaxially with the axle 2a. As the final reduction gear mechanism 13, for example, a chain transmission mechanism may be used.

When the clutch 12 is in the engaged state and the transmission 20 is in the gear-in state, the driving power transmission path 3 is in the "transmission state" in which the driving power is permitted to be transmitted from the electric motor 1 to the drive wheel 2. When the driving power transmission path 3 is in the "transmission state," the speed of the rotation of the motor output shaft 1a is reduced by the primary reduction gear mechanism 11, then the rotation is transmitted to the input shaft 21 via the clutch 12, then the speed of the rotation is changed by the transmission 20, then the rotation is transmitted to the output shaft 22, then the speed of the rotation is reduced by the final reduction gear mechanism 13, and then the rotation is transmitted to the axle 2a. Thereby, the drive wheel 2 is rotated, and the electric vehicle can start to drive.

(Transmission)

The transmission 20 is a multi-stage transmission. The transmission 20 includes a plurality of transmission paths 23A to 23D, which correspond to a plurality of driving gear positions, respectively, with a one-to-one correspondence. Although in the illustrated example, the transmission 20 includes the four transmission paths 23A to 23D, and is able to change the speed in four stages in forward driving, the number of gear positions is not particularly limited so long as the transmission 20 can set two or more gear positions in the same direction (forward driving direction or backward driving direction). The transmission paths 23A to 23D are disconnectably provided on the input shaft 21 and/or the output shaft 22. The transmission paths 23A to 23D are able to change the speed of rotation of the input shaft 21 with different change gear ratios, and transmit the resulting rotation to the output shaft 22. In the gear-in state, one of the transmission paths is selectively established and the remaining transmission paths are disconnected. In the gear-in state, the speed of rotation of the input shaft 21 is changed with the selected transmission path and the change gear ratio of the driving gear position corresponding to the selected transmission path, and the resulting rotation is transmitted to the output shaft 22. In the gear-out state, all of the transmission paths are disconnected (cut-off).

The transmission 20 is a parallel two-shaft gear type transmission. The input shaft 21 and the output shaft 22 extend in parallel with each other. The transmission paths 23A to 23D are arranged to be spaced apart in the axial direction of the input shaft 21 and the output shaft 22 and are independent of each other. The transmission paths 23A to 23D include external gear trains. The transmission paths 23A to 23D include drive gears 24A to 24D provided coaxially with the input shaft 21, and driven gears 25A to 25D provided coaxially with the output shaft 22. The driven gears 25A to 25D are rotated by the corresponding drive gears 24A to 24D, respectively.

The transmission 20 is non-synchronous and constantly in mesh. The drive gears 24A to 24D are constantly in mesh with the corresponding driven gears 25A to 25D, respectively. In any of the transmission paths 23A to 23D, either one of the drive gears 24A to 24D or one of the driven gears 24A to 24D is rotatable along with the corresponding shaft (input shaft 21 in the case of a drive gear, or the output shaft 22 in the case of a driven gear), and the other of one of the drive gears 24A to 24D or the other of the driven gears 24A to 24D is rotatable relatively to the corresponding shaft (input shaft 21 in the case of a drive gear, or the output shaft 22 in the case of a driven gear). This allows the gear-out state to be ensured in the state in which the gears are constantly in mesh in all of the transmission paths 23A to 23D. The transmission 20 includes sleeves 26a, 26b provided on the input shaft 21 and/or the output shaft 22, and dog clutches 27A to 27D for engaging the sleeves 26a, 26b with the above gears which are relatively rotatable. The dog clutches 27A to 27D correspond to the plurality of transmission paths 23A to 23D, respectively, in a one-to-one correspondence. The sleeves 26a, 26b are rotatable along with the corresponding shaft and movable in an axial direction. The above gears which are relatively rotatable face the sleeves 26a, 26b in the axial direction. The dog clutches 27A to 27D include gear sections 28A to 28D mounted on the surfaces of the sleeves 26a, 26b, which face the gears, and groove sections 29A to 29D provided on the above gears which are relatively rotatable, the surfaces facing the sleeves, respectively. When the sleeve is distant from the above gear which is relatively rotatable, the dog clutch corresponding to the gear is disengaged, so that the transmission path corresponding to this dog clutch is disconnected from the input shaft 21 or the output shaft 22. In a state in which all of the dog clutches 27A to 27D are disengaged, as shown in FIG. 1, the transmission 20 enters the gear-out state. In the gear-in state, one particular sleeve is made close to the corresponding gear which is relatively rotatable, a set of dog clutches is selectively engaged, and the rotation of the input shaft 21 is transmitted to the output shaft 22 via the transmission path corresponding to this dog clutch, while the remaining dog clutches are disengaged.

The transmission 20 is a manual transmission. The shift sleeves 26a, 26b are moved or positioned in the axial direction, according to the driver's manual operation of the shift operation member 7. For example, the shift operation member 7 is manually operated to be movable among a plurality of predetermined shift positions and stop at any one of the plurality of shift positions. The plurality of shift positions correspond to a plurality of gear positions (driving gear positions and a neutral gear position) which can be set in the transmission 20, respectively, in a one-to-one correspondence. The plurality of shift positions include a plurality of driving positions corresponding to the driving gear positions, respectively and a neutral position corresponding to the neutral gear position. The plurality of driving positions correspond to the plurality of driving gear positions, respectively, in a one-to-one correspondence. When the shift operation member 7 is displaced, the shift sleeves 26a, 26b are moved in the axial direction. In this case, the shift operation member 7 may be mechanically coupled to the shift sleeves 26a, 26b, and a shift drum (not shown) may be provided between the shift operation member 7 and the shift sleeves 26a, 26b. The shift sleeves 26a, 26b may be controlled to be automatically moved in response to the operation of the shift operation member 7. When the shift operation member 7 is stopped at the neutral position, all of the dog clutches 27A to 27D are disengaged. In other words, the transmission 20 turns into the gear-out state and the neutral gear position is set in the transmission 20. When the shift operation member 7 is stopped at any one of the driving positions, a set of the dog clutches corresponding to the driving position is selectively engaged. In other words, the transmission 20 is in the gear-in state and the driving gear position corresponding to the driving position is selectively set in the transmission 20. When the shift operation member 7 is shifted between the driving positions, the driving gear position is also shifted. Hereinafter, changing the driving gear position will be referred to as "shift change," changing the driving gear position to reduce the reduction gear ratio, i.e., changing the driving gear position into one which results in a higher speed will be referred to as "shift-up," and changing the driving gear position to increase the reduction gear ratio, i.e., changing the driving gear position into one which results in a lower speed will be referred to as "shift-down."

The transmission 20 employs a sequential method. A plurality of driving positions are arranged to be spaced apart from each other according to the direction of the operation of the shift operation member 7, sequentially according to the magnitude of the reduction gear ratio, from the driving position corresponding to a driving gear position with a maximum reduction gear ratio to a driving gear position with a minimum reduction gear ratio. Therefore, in principle, the shift change is performed sequentially according to the magnitude of the reduction gear ratio, and one or more driving gear positions cannot be skipped in the shift change.

(Shift Change Operation)

In the shift-up, the shift operation member 7 is manually shifted to a gear position which is one-gear higher than a present gear position, in response to the driver's manual operation of the shift operation member 7. When the shift operation member 7 starts to be moved, the transmission 20 is changed from the gear-in state to the gear-out state, and the driving power transmission path 3 turns into the non-transmission state. Before the shift operation member 7 is moved or in the middle of the movement of the shift operation member 7, the driver causes the rotational speed at the driving power source side to conform to the rotational speed at the drive wheel side, i.e. performs rev-matching. When the shift-up is performed, it is necessary to decrease the rotational speed of the motor output shaft 1a for rev-matching. After the rev-matching is correctly performed, and the shift operation member 7 finishes the movement, the dog clutch corresponding to the driving position to which the present driving position is to be shifted up, is newly engaged, and the transmission 20 returns from the gear-out state to the gear-in state.

Before the driver manually operates the shift operation member 7, the driver may change the clutch 12 from the engaged state to the disengaged state, to place the driving power transmission path 3 in the non-transmission state. In this state, the driver may wait for the rotational speed of the motor output shaft 1a to be decreased to perform the rev-matching. Then, the driver may place the clutch 12 in the slipping state, and adjust the accelerator opening degree. Thereby, the driver may perform the rev-matching. Then, the driver may place the clutch 12 in the engaged state and adjust the accelerator opening degree. By using the clutch 12 as well as the shift operation member 7, the shift-up operation can be easily performed while mitigating an impact generated when the shift change occurs.

However, since the electric motor 1 has less inertia than an engine, the rotational speed of the motor output shaft 1a tends to be changed in response to a change in the accelerator operation amount. In addition, since the electric motor 1 is lower in rotational resistance than the engine, the rotational speed of the motor output shaft 1a is less likely to be decreased even when the output of the electric motor 1 is zero. This trend is noticeable when the clutch 12 is disengaged, and the motor continues to rotate at a substantially constant speed.

In the shift-down, the shift operation member 7 is manually shifted to a gear position which is one-gear lower than a present gear position, in response to the driver's manual operation of the shift operation member 7. When the shift operation member 7 starts to be moved, the transmission 20 is changed from the gear-in state to the gear-out state, and the driving power transmission path 3 turns into the non-transmission state. Before the shift operation member 7 is moved or in the middle of the movement of the shift operation member 7, the driver performs the rev-matching. When the driver performs the rev-matching in the shift-down, it is necessary to increase the rotational speed of the motor output shaft 1a. Therefore, the driver operates the accelerator operation member 5 to increase the accelerator opening degree. After the rev-matching is correctly performed, and the shift operation member 7 finishes the movement, the dog clutch corresponding to the driving position to which the present driving position is to be shifted up, is newly engaged, and the transmission 20 returns from the gear-out state to the gear-in state.

Before the driver manually operates the shift operation member 7, the driver changes the clutch 12 from the engaged state to the disengaged state, to place the driving power transmission path 3 in the non-transmission state. It this state, the driver may increase the accelerator opening degree to perform the rev-matching. Then, the driver may place the clutch 12 in the slipping state, and finely adjust the accelerator opening degree. Thereby, the driver may perform the rev-matching, and finish the movement of the shift operation member 7. Then, the driver may place the clutch 12 in the engaged state and increase the accelerator opening degree. By using the clutch 12 as well as the shift operation member 7, the shift-down operation can be easily performed while mitigating an impact generated when the shift change occurs.

However, since the electric motor 1 has less inertia and is lower in rotational resistance than the engine is, the rotational speed of the motor output shaft 1a tends to be increased sensitively in response to a change in the accelerator opening degree. Once the rotational speed of the motor output shaft 1a is increased, the increased rotational speed is less likely to be decreased. This trend is noticeable when the clutch 12 is in the disengaged state or in the slipping state, and the motor rotational speed may exceed an intended motor rotational speed.

In the above-described manner, it is necessary for the driver to perform the rev-matching, in the shift-up and the shift-down. Since the transmission 20 is a sequential transmission, the rev-matching is facilitated to some extent. Nonetheless, since the transmission 20 is non-synchronous and constantly in mesh, the driver is required to correctly perform the rev-matching.

(Control Device)

In the present embodiment, the control device 40 is configured to compensate the target output torque of the electric motor 1 to be set in a case where the driving power transmission path 3 is in the transmission state under the same driving states, when the driving power transmission path 3 is in the non-transmission state, to smoothly and easily perform the rev-matching Therefore, this control device 40 is suitably incorporated into the electric vehicle including the above-described transmission 20. Note that the electric motorcycle is small in size and weight, and therefore a relatively significant shift change impact is generated if the rev-matching is incorrectly performed. Typically, the transmission 20 of the electric motorcycle is non-synchronous, constantly in mesh, and manual. For this reason, this control device 40 is suitably incorporated into the electric motorcycle.

Figure 2:
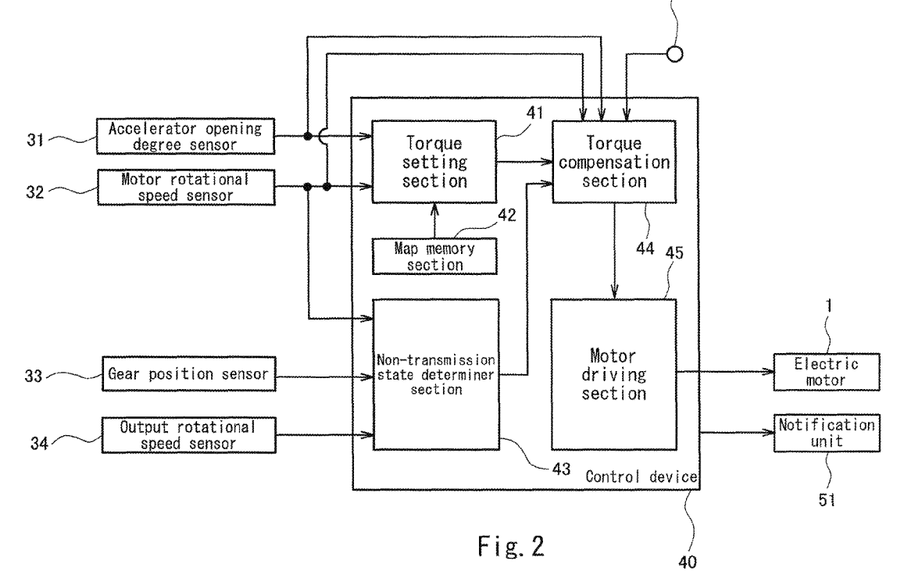
FIG. 2 is a block diagram showing the configuration of the control device of FIG. 1 and a region in the vicinity of the control device.

FIG. 2 is a block diagram showing the configuration of the control device 40 of FIG. 1 and a region in the vicinity of the control device 40. As shown in FIG. 2, the control device 40 is connected at its input side to a motor rotational speed sensor 32, a gear position sensor 33, and an output rotational speed sensor 34, in addition to the above-described accelerator opening degree sensor 31. The motor rotational speed sensor 32 is configured to detect the motor rotational speed (rotational speed of the motor output shaft 1 a).

The gear position sensor 33 is configured to detect whether the transmission 20 is in the gear-in state or the gear-out state. The gear position sensor 33 is also configured to detect which of the gear positions is set in the transmission 20, when the transmission 20 is in the gear-in state. In the example of FIGS. 1 and 2, the gear position sensor 33 is configured to detect the rotational angle of the shift drum (not shown) interposed between the shift operation member 7 and the sleeve 26a, 26b, and output a detection signal indicating whether the transmission 20 is in the gear-in state or the gear-out state, and which of the gear positions is set in the transmission 20. This configuration is merely exemplary, and the gear position sensor 33 may be configured and positioned in anyway, so long as the above detection can be realized.

The output rotational speed sensor 34 is configured to detect the rotational speed of the output element 12b of the clutch 12 or a target rotary member (the input shaft 21, the output shaft 22, the drive element 13a of the final reduction gear mechanism 13, the driven element 13b of the final reduction gear mechanism 13, the axle 2a, or the drive wheel 2) disposed closer to the drive wheel 2 than the output element 12b is. In the present embodiment, as shown in FIG. 1, the output rotational speed sensor 34 is configured to detect the rotational speed of the output shaft 22 and of the drive element 13a rotatable with the output shaft 22.

The control device 40 is connected at its output side to the electric motor 1. The control device 40 decides the torque command value of the electric motor 1, based on the signals received from the above-described sensors 31 to 34, and controls the electric motor 1 such that the output torque generated by the electric motor 1 reaches the decided torque command value. To execute such torque control, the control device 40 includes as functional blocks, a torque setting section 41, a map memory section 42, a non-transmission state determiner section 43, a torque compensation section 44, and a motor driving section 45.

Figure 3:
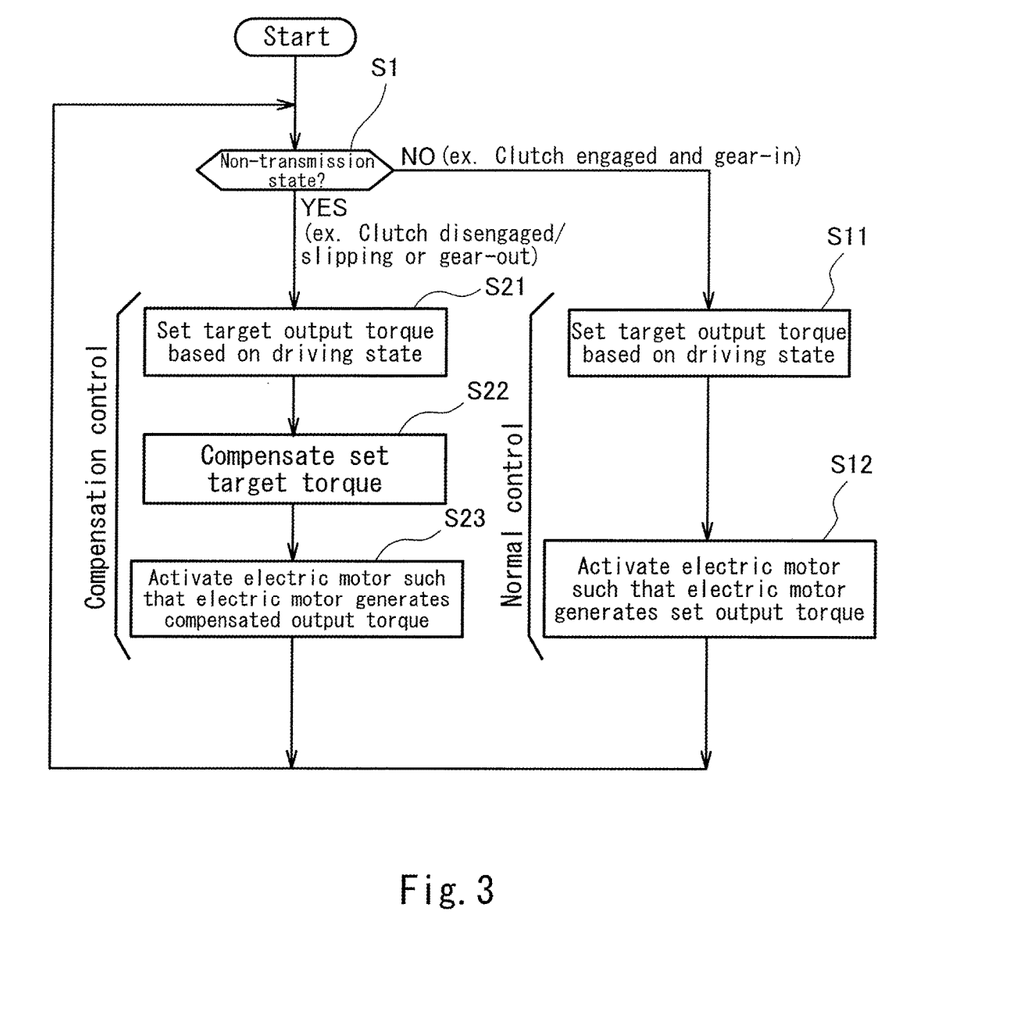
FIG. 3 is a flowchart showing a control process performed by the control device of FIG. 2.

FIG. 3 is a flowchart showing a torque control process performed by the control device 40 of FIG. 2. Hereinafter, with reference to the flow of FIG. 3, the operations of the functional blocks 41 to 45 of FIG. 2 will be described. The flow of FIG. 3 is repeated while the power supply of the electric motorcycle is ON and the power supply of the control device 40 is ON.

Initially, the non-transmission state determiner section 43 determines whether or not the driving power transmission path 3 is in the non-transmission state (step S1). The non-transmission state determiner section 43 determines whether or not the driving power transmission path 3 is in the non-transmission state, based on the signals received from the motor rotational speed sensor 32, the gear position sensor 33, and the output rotational speed sensor 34. In addition, the non-transmission state determiner section 43 determines whether or not the driving power transmission path 3 is in the non-transmission state, based on the state of the clutch 12 and the state of the transmission 20.

The non-transmission state determiner section 43 determines whether or not the transmission 20 is in the gear-in state, based on the signal received from the gear position sensor 33. When the non-transmission state determiner section 43 determines that the transmission 20 is in the gear-in state, it further determines whether or not the clutch 12 is in the engaged state, based on the signals received from the motor rotational speed sensor 32, the gear position sensor 33, and the output rotational speed sensor 34. For example, the non-transmission state determiner section 43 calculates the estimated rotational speed of the target rotary member whose rotational speed is to be detected by the output rotational speed sensor 34, by multiplying the motor rotational speed detected by the motor rotational speed sensor 32, by a change gear ratio from the motor rotational shaft 1a to the target rotary member. In a case where the target rotary member whose rotational speed is to be detected by the output rotational speed sensor 34 is the output shaft 22, the estimated rotational speed is a product of the motor rotational speed, the reduction gear ratio of the primary reduction gear mechanism 11, and the reduction gear ratio corresponding to the driving gear position detected by the gear position sensor 33. The non-transmission state determiner section 43 compares the calculated estimated rotational speed to the rotational speed of the target rotary member (output shaft 22) detected by the output rotational speed sensor 34, to determine whether or not the estimated rotational speed is substantially equal to the detected rotational speed. When the non-transmission state determiner section 43 determines that the estimated rotational speed is substantially equal to the detected rotational speed, it can assume that the clutch 12 is in the engaged state. On the other hand, when the non-transmission state determiner section 43 determines that the estimated rotational speed has deviated from the detected rotational speed, it can assume that the clutch 12 is in the slipping state or in the disengaged state, rather than the engaged state. The state of the clutch 12 may be determined by another method, for example, comparing the rotational speed of the input element 12a to the rotational speed of the output element 12b.

Then, the non-transmission state determiner section 43 determines whether or not the transmission 20 is in the gear-in state and the clutch 12 is in the engaged state. As described above, when the transmission 20 is in the gear-in state and the clutch 12 is in the engaged state, the driving power transmission path 3 is in the transmission state. When the transmission 20 is in the gear-out state, the driving power transmission path 3 is in the non-transmission state, irrespective of the state of the clutch 12. When the transmission 20 is in the gear-in state and the clutch 12 is in the slipping state or in the disengaged state, the driving power transmission path 3 is in the non-transmission state.

When the non-transmission state determiner section 43 determines that the driving power transmission path 3 is in the transmission state (S1: NO), the control device 40 executes normal control. Specifically, the torque setting section 41 sets the target output torque of the electric motor 1 based on the driving state including the accelerator opening degree (step S11). For example, the torque setting section 41 refers to the torque map pre-stored in the map memory section 42. The torque map defines a correspondence between the accelerator opening degree and the target output torque of the electric motor 1. In this correspondence, the accelerator opening degree has a positive correlation with the target output torque. The torque setting section 41 derives the target output torque of the electric motor 1, based on the signal received from the accelerator opening degree sensor 31, with reference to the correspondence defined by the torque map. The driving states (input parameters) used to set the target output torque of the electric motor 1 may include the motor rotational speed detected by the motor rotational speed sensor 32, in addition to the accelerator opening degree.

In the normal control, the target output torque set by the torque setting section 41 is not particularly compensated and is decided as the torque command value. The motor driving section 45 activates the electric motor 1 such that the output torque generated by the electric motor 1 reaches the decided torque command value (step S12). Thereby, the electric motor 1 generates the output torque which reflects the accelerator opening degree. After step S12, the control device 40 returns to the determination step of S1.

When the non-transmission state determiner section 43 determines that the driving power transmission path 3 is in the non-transmission state (S1: YES), the control device 40 initiates a compensation control. In the compensation control, as in step S11 in the normal control, the torque setting section 41 sets the target output torque of the electric motor 1 based on the driving state (step S21). Then, the torque compensation section 44 compensates the target output torque set by the torque setting section 41 (step S22). The specific compensation method will be described later.

After the torque compensation section 44 has compensated the target output torque, the compensation value is set as the torque command value. The motor driving section 45 activates the electric motor 1 such that the output torque generated by the electric motor 1 reaches the decided torque command value (i.e., output torque compensated by the torque compensation section 44) (step S23). After step S23, the control device 40 returns to the determination process of step S1.

The electric motorcycle 1 generates less noise and vibration generated according to the operation of the driving power source, than an engine-driven vehicle. Therefore, the driver does not easily recognize the magnitude or increase/decrease of the motor rotational speed. In light of this, the control device 40 preferably includes a notification unit 51 which notifies the driver of the motor rotational speed. The notification unit 51 may be a display unit which displays, for example, the specific numeric value of the motor rotational speed. The control device 40 may activate the notification unit 51 when the motor rotational speed falls into a proper rotational speed range suitable for the rev-matching. This allows the driver to know that the motor rotational speed has been adjusted properly. The notification unit 51 may notify the driver by changing the color of the specific numeric value or a display/lighting pattern into a particular one in the above display unit. A notification means (display unit or sound emission unit) which is other than the above display unit may operate to notify the driver of the information.

(Torque Compensation in Non-Transmission State)

Example 1

Now, the compensation of the target output torque performed by the torque compensation section 44 will be described. In Example 1, the torque compensation section 44 compensates the target output torque Tcmd set by the torque setting section 41 by using a slowness characteristic in which a change in the motor rotational speed which occurs with time is slower when the driving power transmission path is in the non-transmission state than when the driving power transmission path is in the transmission state, to derive a compensated output torque Tr1. In a case where the torque compensation section 44 contains a compensation value calculation formula including a slowness coefficient K as the slowness characteristic, and assigns the value of the target output torque Tcmd to the compensation value calculation formula, to derive the value of the compensated output torque Tr1, the compensation value calculation formula can be represented by the following formula (1):

$$Tr1 = Tcmd \times K \qquad (1)$$

Specifically, the torque compensation section 44 compensates the target output torque Tcmd set by the torque setting section 41 to derive the compensated output torque Tr1, by multiplying the target output torque Tcmd by the slowness coefficient K. In this case, the slowness coefficient K is preferably a positive value smaller than 1, to slow the change in the motor rotational speed which occurs with time ($0 < K < 1$).

Compensating the target output torque Tcmd by using the slowness coefficient K causes a slower response of the motor rotational speed with respect to a change in the accelerator opening degree when the driving power transmission path 3 is in the non-transmission state, than when the driving power transmission path 3 is in the transmission state. This makes it possible to suppress a rapid change in the motor rotational speed without a need to manipulate an accelerator, when the driving power transmission path 3 is in the non-transmission state. Therefore, during the shift-up or the shift-down, the motor rotational speed can be easily adjusted while preventing the motor rotational speed from deviating from a desired or proper range, or fluctuating, and the driver can easily perform the rev-matching. Especially, during the shift-down, it is necessary to increase the accelerator opening degree to increase the motor rotational speed to perform the rev-matching. At this time, even when the driver performs an accelerator operation roughly, the motor rotational speed can be easily increased to fall within the range suitable for the rev-matching, while preventing the motor rotational speed from being increased excessively. Or, even when the accelerator opening degree is changed, the motor rotational speed can be maintained within the proper range. As a result, the shift-down operation can be performed smoothly and easily.

The numeric value of the slowness coefficient K may be decided in such a manner that in calculation, a virtual rotary member (not shown) having a virtual inertia Iv larger than the motor inertia Ir of the electric motor 1 is defined, and a difference between the motor inertia Ir and the virtual inertia Iv may be reflected in the slowness coefficient K. In this case, an angular acceleration $\Delta\omega1$ of the virtual rotary member which is estimated to be generated when the virtual rotary member is rotated with the target output torque Tcmd set by the torque setting section 41 is found. It is assumed that the value required to rotate the electric motor 1 at the angular acceleration $\Delta\omega1$ is the compensated output torque Tr1. The numeric value of the slowness coefficient K is decided to realize such compensation.

Specifically, when the virtual rotary member is rotated with the target output torque Tcmd, the angular acceleration $\Delta\omega1$ of the virtual rotary member is represented by the following formula (2):

$$\Delta\omega1 = \frac{Tcmd}{Iv} \qquad (2)$$

The compensated output torque Tr1 is represented by the following formula (3) considering the motor inertia Ir and using the formula (2):

$$Tr1 = \Delta\omega1 \times Ir = Tcmd \times \frac{Ir}{Iv} \qquad (3)$$

As can be understood from the formula (1) and the formula (3), the slowness coefficient K can be a ratio of the motor inertia Ir to the virtual inertia Iv, and may be a value derived by dividing the motor inertia Ir by the virtual inertia Iv (K=Ir/Iv). Since the virtual inertia Iv is larger than the motor inertia Ir, the slowness coefficient K (=Ir/Iv) is a positive value smaller than 1.

After the numeric value of the slowness coefficient K has been decided, a change in the motor rotational speed which occurs with time in the state in which the driving power transmission path 3 is in the non-transmission state is allowed to simulate a change in the rotational speed of the virtual rotary member which occurs with time. This makes it possible to easily architect the compensation control performed by the control device 40, and easily attain a desired result (degree of slowness of a change in the motor rotational speed which occurs with time).

As the virtual rotary member, the output shaft of an existing engine, the output shaft of a non-existing engine with characteristics similar to that of the existing engine, or the output of an engine with ideal characteristics to an architect is defined, and the virtual inertia Iv is the inertia of the output shaft of any of the engines, which is a suitable example.

In the above-described manner, the behavior of the motor rotational speed can be changed as in an engine speed, when the driving power transmission path 3 is in the non-transmission state. This allows the driver to attain a driving feel similar to that of driving of the engine-driven vehicle. Even the driver who is familiar with the driving of the engine-driven vehicle can drive the electric vehicle including the transmission 20 without discomfort, and smoothly and easily perform the rev-matching The specific numeric value of the motor inertia Ir can be obtained through an actual measurement test using the electric motor 1. The specific numeric value of the virtual inertia Iv can also be obtained through an actual measurement test using the defined virtual rotary member, or by modifying the value obtained from the actual measurement test.

The slowness coefficient K may be any coefficient so long as it can slow (lower) the response to the operation of the accelerator. The slowness coefficient K may be a lag element which slows a change in the accelerator opening degree within the control device 40, instead of considering the inertias. With the lag element, a change in the target output torque set based on the accelerator opening degree, resulting from the lag operation, is slower than a change in the target output torque to be originally set. The slowness coefficient K may be a lag element which slows a change in the output torque set based on the accelerator opening degree.

The torque compensation section 44 compensates the target output torque Tcmd set by the torque setting section 41 considering the slowness coefficient K in such a manner that the slowness coefficient K is changed depending on the driving state. The slowness coefficient K may be changed based on, for example, the motor rotational speed detected by the motor rotational speed sensor 32. In this case, the slowness coefficient K may be increased with an increase in the motor rotational speed. This can cause performance of the shift change to take time without excessively decreasing the motor rotational speed, even during a high-speed rotation.

Example 2

In Example 2, the torque compensation section 44 compensates the target output torque Tcmd set by the torque setting section 41, considering a decrease term L for decreasing the motor rotational speed, in addition to the slowness characteristic, to derive a compensated output torque Tr2. In a case where the torque compensation section 44 contains a compensation value calculation formula including the decrease term L as well as the slowness coefficient K as the slowness characteristic, and assigns the value of the target output torque Tcmd to the compensation value calculation formula, to derive the value of the compensated output torque Tr2, the compensation value calculation formula can be represented by, for example, the following formula (4):

$$Tr2 = (Tcmd - L) \times K \qquad (4)$$

Specifically, the torque compensation section 44 compensates the target output torque Tcmd set by the torque setting section 41 to derive the compensated output torque Tr2, by subtracting the decrease term L from the target output torque Tcmd and by multiplying the subtraction value by the slowness coefficient K. In the formula (4), L is a positive value (L>0).

By compensating the target output torque Tcmd using the decrease term L, the motor rotational speed is decreased in an accelerative manner when the driving power transmission path 3 is in the non-transmission state. This can reduce the time that passes until the motor rotational speed falls into the range suitable for the rev-matching, and perform the shift-up operation smoothly, during the shift-up. Or, during the shift-down, even when the motor rotational speed is increased excessively, the motor rotational speed can quickly fall within the range suitable for the rev-matching, and the shift-down operation can be performed smoothly.

The numeric value of the decrease term L may be decided in such a manner that in calculation, a virtual rotary member (not shown) with a virtual rotational resistance Rv higher than the motor rotational resistance Rr of the electric motor 1 is defined, and the virtual rotational resistance Rv may be reflected in the decrease term L. In this case, an angular acceleration Δω2 of the virtual rotary member which is estimated to be generated when the virtual rotary member with the virtual rotational resistance Rr is rotated with the target output torque Tcmd set by the torque setting section 41 is found. It is assumed that the value required to rotate the electric motor 1 at the angular acceleration Δω2 is the compensated output torque Tr2. The numeric value of the decrease term L is preferably decided to realize such compensation.

Specifically, when the virtual rotary member having the virtual rotational resistance Rv is rotated with the target output torque Tcmd, the angular acceleration Δω2 of the virtual rotary member is represented by the following formula (5) considering the virtual inertia Iv of the virtual rotary member:

$$\Delta\omega 2 = \frac{Tcmd - Rv}{Iv} \quad (5)$$

The compensated output torque Tr2 is represented by the following formula (6) considering the motor inertia Ir and using the formula (5):

$$Tr2 = \Delta\omega 2 \times Ir = (Tcmd - Rv) \times \frac{Ir}{Iv} \quad (6)$$

As can be understood from the formula (4) and the formula (6), the slowness coefficient K can be a ratio of the motor inertia Ir to the virtual inertia Iv, and the decrease term L can be the virtual rotational resistance Rv.

After the numeric value of the decrease term L has been decided, considering the virtual rotational resistance Rv of the virtual rotary member separately from the motor rotational resistance Rr, the decrease behavior of the motor rotational speed in the state in which the driving power transmission path 3 is in the non-transmission state is allowed to simulate the decrease behavior of the rotational speed of the virtual rotary member This makes it possible to easily architect the compensation control performed by the control device 40, and easily attain a desired result (the decrease behavior of the motor rotational speed).

In the formula (6), a difference between the motor inertia Ir of the electric motor 1 and the virtual inertia Iv of the virtual rotary member is considered, as well as the virtual rotational resistance Rv of the virtual rotary member. Because of this, the behavior of the motor rotational speed in the state in which the driving power transmission path 3 is in the non-transmission state is allowed to simulate the behavior of the rotational speed of the virtual rotary member even better.

As the virtual rotary member, the output shaft of the engine is defined as in Example 1, and the virtual rotational resistance Rv is the rotational resistance of the engine, which is a suitable example. In this case, the virtual rotational resistance Rv is preferably set by considering a pumping loss, an intake/exhaust resistance, as well as a friction resistance of a bearing or a friction resistance caused by suction-up of lubricating oil. The specific value of the virtual rotational resistance Rv can be obtained through an actual measurement test or by modifying the value obtained from the actual measurement test.

The torque compensation section 44 compensates the target output torque Tcmd set by the torque setting section 41 considering the slowness coefficient K and the decrease term L in such a manner that the decrease term L is changed based on the driving state. The decrease term L preferably corresponds to the virtual rotational resistance Rv of the virtual rotary member. The virtual rotational resistance Rv may sometimes be increased/decreased depending on the driving state. For example, in a case where the virtual rotary member is the output of the engine, the virtual rotational resistance Rv is increased with an increase in the motor rotational speed of the virtual rotary member.

Therefore, the decrease term L may be changed depending on the motor rotational speed detected by the motor rotational speed sensor 32. In this case, the decrease term L may be increased with an increase in the motor rotational speed (so that the target output torque Tcmd is compensated to be decreased significantly). This is especially effective when the virtual rotary member is the shaft output of the engine.

In a case where the torque compensation section 44 contains a compensation value calculation formula, and assigns the value of the target output torque Tcmd to the compensation value calculation formula, to derive the value of the compensated output torque Tr2, for example, the decrease term L may be derived by using the following formula (7). In this case, the compensated output torque Tr2 is represented by the following formula (8) by using the formula (4) and the formula (7):

$$L = Rv = Cv \times \omega^2 \quad (7)$$

$$Tr2 = (Tcmd - Cv \times \omega^2) \times K \quad (8)$$

where Cv is a resistance coefficient of the virtual rotary member. As described above in Example 1, the slowness coefficient K is preferably the positive value smaller than 1. The slowness coefficient K can be a ratio of the motor inertia Ir to the virtual inertia Iv. In this case, the formula (8) can be transformed into the following formula (9). Of course, the slowness coefficient K may be changed depending on the driving state, or may be a value derived by an approach which is different from consideration of the inertias.

$$Tr2 = (Tcmd - Cv \times \omega^2) \times \frac{Ir}{Iv} \qquad (9)$$

When the decrease term L is changed in proportion to the square of the motor rotational speed ω detected by the motor rotational speed sensor 32, the decrease term L more highly reflects the virtual rotational resistance Rv. Thereby, the behavior of the motor rotational speed in the state in which the driving power transmission path 3 is in the non-transmission state is allowed to come closer to the behavior of the rotational speed of the virtual rotary member.

Although in the formula (7), the decrease term L (virtual rotational resistance Rv) is in proportion to the square of the motor rotational speed, the decrease term L may be found from an n-order formula or a primary formula including an n-th power term and/or a 1st power term of the motor rotational speed (in this example, n is an integer that is equal to or larger than 2). Or, the decrease term L may be changed depending on the driving state which is other than the motor rotational speed, for example, an accelerator opening degree or a temperature.

Example 3

In Example 3, the torque compensation section 44 compensates the target output torque Tcmd set by the torque setting section 41, considering an increase term M for increasing the motor rotational speed, in addition to the slowness characteristic and the decrease term L, to derive a compensated output torque Tr3. In a case where the torque compensation section 44 contains a compensation value calculation formula including the slowness coefficient K as the slowness characteristic, the decrease term L, and the increase term M, and assigns the value of the target output torque Tcmd to the compensation value calculation formula, to derive the value of the compensated output torque Tr3, the compensation value calculation formula can be represented by, for example, the following formula (10):

$$Tr3 = (Tcmd - L) \times K + M \qquad (10)$$

The numeric value of the increase term M may be decided in such a manner that in calculation, a virtual rotary member is defined as in Example 2, and the motor rotational resistance Rr of the electric motor 1 is preferably reflected on the increase term M as well as the virtual rotational resistance Rr. In this case, the value required to rotate the electric motor 1 with the motor rotational resistance Rr at the angular acceleration Δω2 of Example 2 is the compensated output torque Tr3. Specifically, the compensated output torque Tr3 is represented by the following formula (11) using the formula (5) and the formula (10), considering the motor inertia Ir:

$$Tr3 = \Delta\omega 2 \times Ir + Rr = (Tcmd - Rv) \times \frac{Ir}{Iv} + Rr \qquad (11)$$

As can be understood from the formula (10) and the formula (11), the slowness coefficient K can be a ratio of the motor inertia Ir to the virtual inertia Iv, the decrease term L can be the virtual rotational resistance Rv, and the increase term M can be the motor rotational resistance Rr. Note that the specific numeric value of the motor rotational resistance Rr can be obtained through the actual measurement test using the electric motor 1.

Since the value of the motor rotational resistance Rr is small, the practice is not affected even when the value of the motor rotational resistance Rr is ignored as in Example 2. If the increase term M corresponding to the motor rotational resistance Rr is considered, as in the present example, it becomes possible to prevent the virtual rotational resistance Rv of the virtual rotary member from being overvalued. This makes it possible to prevent a situation in which the motor rotational speed is rapidly decreased to be lower than the rotational speed of the virtual rotary member, and to cause the behavior of the motor rotational speed to be closer to the behavior of the rotational speed of the virtual rotary member, when the driving power transmission path 3 is in the non-transmission state.

Like the virtual rotational resistance Rv, the motor rotational resistance Rr may be increased or decreased depending on the driving state. In light of this, the torque compensation section 44 may compensate the target output torque Tcmd set by the torque setting section 41 considering the slowness coefficient K, the decrease term L, and the increase term M in such a manner that the increase term M is changed depending on the driving state.

In a case where the torque compensation section 44 contains a compensation value calculation formula, and assigns the value of the target output torque Tcmd to the compensation value calculation formula, to derive the value of the compensated output torque Tr3, the increase term M may be derived by using the following formula (12). In this case, the compensated output torque Tr3 is represented by the following formula (13) by using the formula (10) to the formula (12).

$$M = Rr = Cr \times \omega^2 \qquad (12)$$

$$Tr3 = (Tcmd - cv \times \omega^2) \times K + Cr \times \omega^2 \qquad (13)$$

where Cr is the resistance coefficient of the electric motor 1. As described above in Example 1, the slowness coefficient K is preferably the positive value smaller than 1. The slowness coefficient K can be a ratio of the motor inertia Ir to the virtual inertia Iv. In this case, the formula (13) can be transformed into the following formula (14). Of course, the slowness coefficient K may be changed depending on the driving state, or may be a value derived by an approach which is different from consideration of the inertias.

$$Tr3 = (Tcmd - Cv \times \omega^2) \times \frac{Ir}{Iv} + Cr \times \omega^2 \qquad (14)$$

When the increase term M is changed in proportion to the square of the motor rotational speed ω detected by the motor rotational speed sensor 32 as in the decrease term L, the increase term M more highly reflects the value of the motor rotational resistance Rr. This allows the behavior of the motor rotational speed to come closer to the behavior of the rotational speed of the virtual rotary member in the state in which the driving power transmission path 3 is in the non-transmission state.

Although in the formula (12), the increase term M (motor rotational resistance Rr) is in proportion to the square of the motor rotational speed, the increase term M may be found from a n-order formula or a primary formula including the n-th power term and/or the 1st power term of the motor rotational speed (in this example, n is an integer that is equal to or larger than 2). Or, the increase term M may be changed depending on the driving state which is other than the motor rotational speed. In some cases, the motor rotational resistance Rr may be increased over time, due to degradation of the motor. In light of this, the increase term M may be changed depending on a period for which the electric vehicle is practically used. For example, the increase term M may be changed to be increased to be compatible with the actual motor rotational resistance Rr, as the time of the practice is increased.

Example 4

In Example 4, the torque compensation section 44 changes the slowness coefficient K in response to the driver's manual operation. For example, the torque compensation section 44 contains a plurality of slowness coefficients K (K1, K2 . . . Kn) as the slowness characteristics. The driver manually operates a change switch 39 (see FIG. 2) to provide a command indicating which of the slowness characteristics should be used to compensate the target output torque Tcmd, when the driving power transmission path 3 is in the non-transmission state.

As described in Example 1, the slowness coefficient K preferably corresponds to the ratio between the motor inertia Ir and the virtual inertia Iv. The plurality of slowness coefficients K can reflect the virtual inertias Iv of a plurality of different virtual rotary members, respectively. For example, it may be assumed that the first slowness coefficient K1 is the value set considering the inertia of the output shaft of a two-cylinder engine, and the second slowness coefficient K2 is the value set considering the inertia of the output shaft of a four-cylinder engine. The driver can select the virtual rotary member to be simulated, according to the driver's preference, by using the change switch 39. The control device 40 can cause the behavior of the motor rotational speed to simulate the behavior of the two-cylinder engine, the behavior of the four-cylinder engine, the behavior of a high displacement engine, the behavior of a V-type engine, or the behavior of an in-line type engine.

The torque compensation section 44 may change the decrease term L in addition to the slowness coefficient K in response to the driver's manual operation. In this case, the torque compensation section 44 contains a plurality of decrease terms L (L1, L2 . . . Ln). As described in Example 2, the decrease term L preferably corresponds to the virtual rotational resistance Rv. For this reason, the torque compensation section 44 preferably contains the plurality of decrease terms L1, L2 . . . Ln and the plurality of slowness coefficients K1, K2 . . . Kn in a one-to-one correspondence. Specifically, the torque compensation section 44 preferably contains a pair of the slowness coefficient L and the decrease term L corresponding to each of the defined virtual rotary members. In this way, the behavior of the motor rotational speed can simulate the behavior of each of various virtual rotary members, with high accuracy.

Thus far, the embodiment of the present invention has been described. The above-described configuration may be changed, deleted, or added with other configurations, within a scope of the spirit of the present invention. For example, the slowness coefficient K, the decrease term L, and the increase term M may be changed over time. In this case, learning control for the slowness coefficient K and the decrease term L may be performed based on the operation speed of a mechanism (e.g., shift drum) provided between the shift operation member and the shift sleeve. Or, the value of each of the slowness coefficient K, the decrease term L, and the increase term M may be made different between the shift-up and the shift-down.

Although as the example of the compensation considering the slowness coefficient K, the torque compensation section 44 assigns the value of the target output torque to the compensation value calculation formula including the slowness coefficient K, to derive the value of the compensated output torque, the torque compensation section 44 may contain a map or table used to derive the compensated output torque based on the driving state including the accelerator opening degree, separately from a torque map used in the normal control, and derive the compensated output torque with reference to the map or the table, when the driving power transmission path is in the non-transmission state. In this case, the value corresponding to the driving state in the map or the table may be the value obtained considering the slowness coefficient K.

Although in the above-described embodiment, the control device 40 executes the torque control, in the state in which the driving power transmission path 3 is in the non-transmission state, it may execute rotational speed control, in the state in which the driving power transmission path 3 is in the non-transmission state, to achieve the above-described advantages. The control device 40 may compensate the motor rotational speed set based on the accelerator opening degree, when the driving power transmission path 3 is in the non-transmission state, to slow a change in the motor rotational speed which occurs with time, or decrease the motor rotational speed in an accelerative manner.

The slowness characteristic (slowness coefficient K), the decrease term L, or the increase term M may be made different, between a case where the clutch 12 turns into the slipping state or the disengaged state and thereby the driving power transmission path 3 turns into the non-transmission state, and a case where the transmission 20 turns into the gear-out state and the driving power transmission path 3 turns into the non-transmission state. This makes it possible to smoothly perform the rev-matching, considering the rotary member of the clutch 12. Although in the above-described embodiment, the driving power transmission mechanism constituting the driving power transmission path 3 includes the clutch 12, the clutch 12 may be omitted. In a case where the driving power transmission mechanism includes the clutch 12, the transmission 20 may be a continuously variable transmission (CVT) including a movable pulley and a belt.

The slowness characteristic (slowness coefficient K), the decrease term L, or the increase term M may be set to a value which simulates the electric motor 1 or the virtual rotary member such as the engine, or may be set without regard to simulation of the electric motor 1 or the virtual rotary member such as the engine. In other words, a logic for deriving the compensation value need not form a model for causing the actual behavior of the rotational speed of the electric motor 1 to simulate the behavior of the rotational speed of the virtual rotary member, so long as the values are properly set to easily perform the rev-matching, or to easily perform the shift change are used.

In the state in which the driving power transmission path 3 is in the non-transmission state, the slowness coefficient K (ratio of the motor inertia Ir to the virtual inertia Iv), the decrease term L (corresponding to the virtual rotational resistance Rv), or the increase term M (corresponding to the motor rotational resistance Rr) may be changed based on the motor rotational speed. This allows the motor rotational speed to reach a certain rotational speed range in a short time, or increases time that passes until the motor rotational speed falls outside of the certain rotational speed range. In this case, the decrease term M and the slowness coefficient K may be reduced during a high-speed rotation (virtual inertia Iv may be increased during the high-speed rotation). Or, the slowness coefficient K, the decrease term L, and/or the increase term M may be learned based on the rotational speed of the shift drum, and these values may be updated. In this case, if the change gear operation is quick, the slowness coefficient K may be increased, while if the change gear operation is slow, the slowness coefficient K may be decreased. Or, the slowness coefficient K, the decrease term L, and/or the increase term M may be changed based on the change gear ratio of the driving gear position set in the transmission 20. Or, it may be determined whether the shift-up or the shift-down is being performed, and the slowness coefficient K, the decrease term L, and/or the increase term M may be changed depending on the shift-up or the shift-down.

Although in the above-described embodiment, the slowness coefficient K included in the compensation value calculation formula and by which the target output torque (i.e., accelerator operation amount used to derive the target output torque) is to be multiplied is used as the slowness characteristic in which the motor rotational speed is slower when the driving power transmission path 3 is in the non-transmission state than when the driving power transmission path 3 is in the transmission state. The use of the slowness characteristic of the present invention is not limited to this, and the compensation calculation formula is not limited to the above-described examples. The torque compensation section 44 may compensate the target output torque Tcmd in any way so long as the slowness characteristic is set to make a torque change amount per unit of time less when the driving power transmission path 3 is in the non-transmission state than when the driving power transmission path 3 is in the transmission state. For example, the torque compensation section 44 may provide a torque command of speed feedback which limits a change in the rotational speed, or compensates the target output torque Tcmd in a state in which requested torque commands include a reverse torque command. The change in the motor rotational speed which occurs with time may be made slower in both of a case where the motor rotational speed is increased and a case where the motor rotational speed is decreased, or in either one of the case where the motor rotational speed is increased and the case where the motor rotational speed is decreased. Nonetheless, preferably, the change in the motor rotational speed which occurs with time may be made slower in at least the case where the motor rotational speed is increased.

INDUSTRIAL APPLICABILITY

The present invention can achieve an advantage that rev-matching can be easily performed by a driver's operation of an accelerator when a driving power transmission path is in a non-transmission state, in an electric vehicle including a transmission interposed between an electric motor and the drive wheel. In particular, the present invention is widely applicable to electric vehicles including manual transmissions.

REFERENCE CHARACTER LIST 1 electric motor
2 drive wheel
3 driving power transmission path
12 clutch
20 transmission
31 accelerator opening degree
32 motor rotational speed sensor
33 gear position sensor
34 output rotational speed sensor
39 change switch
40 control device
41 torque setting section
43 non-transmission state determiner section
44 torque compensation section

The invention claimed is:

1. A control system of an electric vehicle including a transmission provided on a driving power transmission path through which a driving power is transmitted from an electric motor to a drive wheel, the control system comprising:
a control device configured to execute:
a torque setting section for setting a target output torque of the electric motor based on a driving state including an accelerator operation amount;
a non-transmission state determiner section for determining whether the driving power transmission path is in a non-transmission state in which the driving power is not permitted to be transmitted from the electric motor to the drive wheel or in a transmission state in which the driving power is permitted to be transmitted from the electric motor to the drive wheel; and
a torque compensation section for compensating the target output torque set by the torque setting section, by using a slowness characteristic in which a change in a motor rotational speed which occurs with time is slower, in a state in which the driving power transmission path is in the non-transmission state, than in a state in which the driving power transmission path is in the transmission state, when the non-transmission state determiner section determines that the driving power transmission path is in the non-transmission state,
wherein the torque setting section, the non-transmission state determiner section, and the torque compensation section are software programs executed by the control device, and
wherein the torque compensation section compensates the target output torque in such a manner that a degree of slowness is decreased with an increase in the motor rotational speed of the electric motor.

2. The control system of the electric vehicle according to claim 1,
wherein the torque compensation section compensates the target output torque by using a compensation value calculation formula including a decrease term for decreasing the motor rotational speed.

3. The control system of the electric vehicle according to claim 1,
wherein the torque compensation section compensates the target output torque to reach a value required to rotate the electric motor at an angular acceleration of a virtual rotary member which is estimated to be generated when the virtual rotary member is rotated with the target output torque, the virtual rotary member having a virtual inertia larger than a motor inertia of the electric motor.

4. The control system of the electric vehicle according to claim 3,
wherein the virtual rotary member is defined as having a rotational resistance higher than a rotational resistance of the electric motor.

5. The control system of the electric vehicle according to claim 1, wherein the slowness characteristic used by the torque compensation section is manually changeable.

6. The control system of the electric vehicle according to claim 1,
wherein the slowness characteristic is one of a plurality of slowness characteristics, and
wherein the torque compensation section selects one slowness characteristic from the plurality of slowness characteristics, and compensates the target output torque by using the selected slowness characteristic.

7. The control system of the electric vehicle according to claim 1,
wherein the electric vehicle includes a shift operation member which is manually operated to operate the transmission, and
wherein the transmission includes a plurality of driving positions arranged to be spaced apart from each other in a direction in which the shift operation member is operated, sequentially according to a magnitude of a reduction gear ratio, from the driving position corresponding to a driving gear position with a maximum reduction gear ratio to the driving position corresponding to a driving gear position with a minimum reduction gear ratio, and is configured to perform in a sequential manner shift change in response to an operation of the shift operation member according to the magnitude of gear reduction ratio.

8. The control system of the electric vehicle according to claim 1,
wherein the torque compensation section compensates the target output torque set by the torque setting section, by using the slowness characteristic in which the change in the motor rotational speed which occurs with time is slower, compared to the target output torque corresponding to the accelerator operation amount in the state in which the driving power transmission path is in the transmission state, when an accelerator is operated in the state in which the driving power transmission path is in the non-transmission state.

9. A control system of an electric vehicle including a transmission provided on a driving power transmission path through which a driving power is transmitted from an electric motor to a drive wheel, the control system comprising:
a control device configured to execute:
a torque setting section for setting a target output torque of the electric motor based on a driving state including an accelerator operation amount;
a non-transmission state determiner section for determining whether the driving power transmission path is in a non-transmission state in which the driving power is not permitted to be transmitted from the electric motor to the drive wheel or in a transmission state in which the driving power is permitted to be transmitted from the electric motor to the drive wheel; and
a torque compensation section for compensating the target output torque set by the torque setting section, by using a slowness characteristic in which a change in a motor rotational speed which occurs with time is slower, in a state in which the driving power transmission path is in the non-transmission state, than in a state in which the driving power transmission path is in the transmission state, when the non-transmission state determiner section determines that the driving power transmission path is in the non-transmission state,
wherein the torque setting section, the non-transmission state determiner section, and the torque compensation section are software programs executed by the control device, and
wherein the torque compensation section compensates the target output torque in such a manner that a value is multiplied by a coefficient of a positive value which is smaller than 1.

10. A control system of an electric vehicle including a transmission provided on a driving power transmission path through which a driving power is transmitted from an electric motor to a drive wheel, the control system comprising:
a control device configured to execute:
a torque setting section capable of setting target output torque of the electric motor based on a driving state including an accelerator operation amount;
a non-transmission state determiner section capable of determining whether the driving power transmission path is in a non-transmission state in which the driving power is not permitted to be transmitted from the electric motor to the drive wheel or in a transmission state in which the driving power is permitted to be transmitted from the electric motor to the drive wheel; and
a torque compensation section capable of compensating the target output torque set by the torque setting section, by using a slowness characteristic in which a change in a motor rotational speed which occurs with time is slower, in a state in which the driving power transmission path is in the non-transmission state, than in a state in which the driving power transmission path is in the transmission state, when the non-transmission state determiner section determines that the driving power transmission path is in the non-transmission state,
wherein the torque setting section, the non-transmission state determiner section, and the torque compensation section are software programs executed by the control device, and
wherein the torque compensation section compensates the target output torque in such a manner that a degree of slowness is decreased with an increase in the motor rotational speed of the electric motor.

11. The control system of the electric vehicle according to claim 10,
wherein the control device is electrically connected at its input side to an accelerator opening degree sensor, a motor rotational speed sensor, a gear position sensor, and an output rotational speed sensor, and electrically connected at its output side to the electric motor, and
wherein the control device decides a torque command value of the electric motor based on signals received from the accelerator opening degree sensor, the motor rotational speed sensor, the gear position sensor, and the output rotational speed sensor, and controls the electric motor such that output torque generated by the electric motor conforms to the decided torque command value.

12. A method of controlling an electric vehicle including a transmission provided on a driving power transmission path through which a driving power is transmitted from an electric motor to a drive wheel, the method comprising:
setting target output torque of the electric motor based on a driving state including an accelerator operation amount;

determining whether the driving power transmission path is in a non-transmission state in which the driving power is not permitted to be transmitted from the electric motor to the drive wheel or in a transmission state in which the driving power is permitted to be transmitted from the electric motor to the drive wheel; and compensating the target output torque set in the setting of the target output torque, by using a slowness characteristic in which a change in a motor rotational speed which occurs with time is slower, in a state in which the driving power transmission path is in the non-transmission state, than in a state in which the driving power transmission path is in the transmission state, when it is determined that the driving power transmission path is in the non-transmission state, wherein the torque compensation section compensates the target output torque in such a manner that a degree of slowness is decreased with an increase in the motor rotational speed of the electric motor.

13. A method of controlling an electric vehicle including a transmission provided on a driving power transmission path through which a driving power is transmitted from an electric motor to a drive wheel, the method comprising:

setting target output torque of the electric motor based on a driving state including an accelerator operation amount;

determining whether the driving power transmission path is in a non-transmission state in which the driving power is not permitted to be transmitted from the electric motor to the drive wheel or in a transmission state in which the driving power is permitted to be transmitted from the electric motor to the drive wheel; and compensating the target output torque set in the setting of the target output torque, by using a slowness characteristic in which a change in a motor rotational speed which occurs with time is slower, in a state in which the driving power transmission path is in the non-transmission state, than in a state in which the driving power transmission path is in the transmission state, when it is determined that the driving power transmission path is in the non-transmission state, wherein in the compensating of the target output torque, the target output torque is compensated in such a manner that a value is multiplied by a coefficient of a positive value which is smaller than 1.

* * * * *